March 13, 1962
R. MARTIN ET AL
3,025,226
DEVICES FOR INTRODUCING ELEMENTS, AND IN PARTICULAR FUEL
RODS INTO NUCLEAR REACTORS AND/OR FOR WITHDRAWING
SUCH ELEMENTS FROM SAID REACTORS
Filed Sept. 6, 1957
9 Sheets-Sheet 1
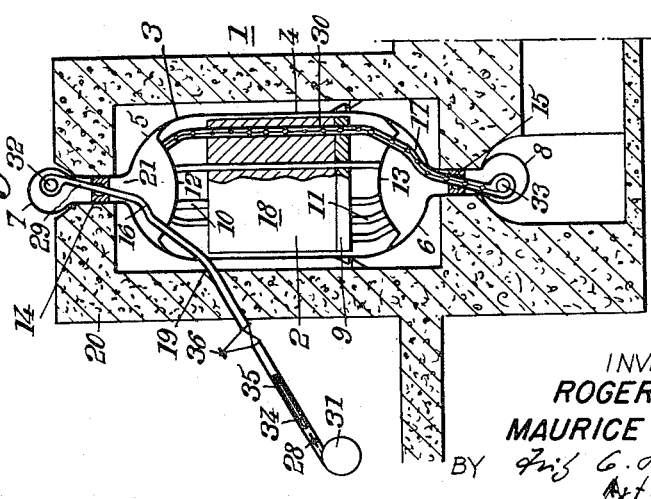
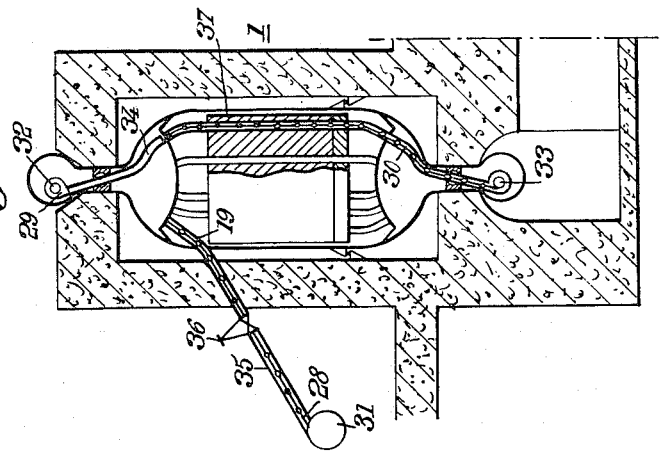
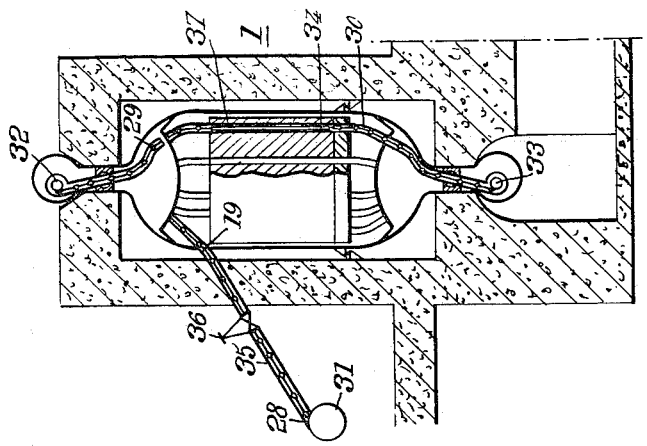
INVENTORS
ROGER MARTIN
MAURICE MOULIN
BY

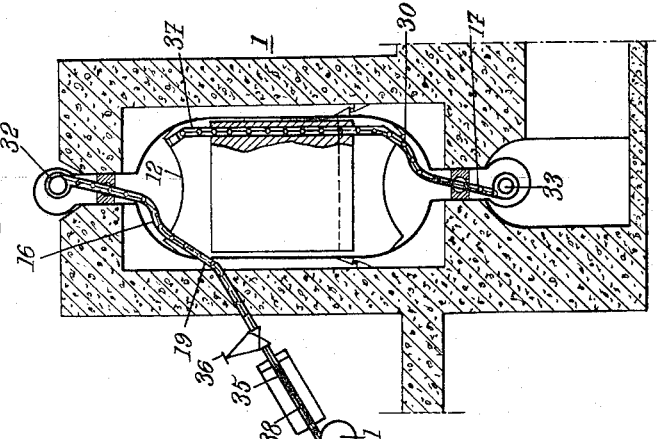
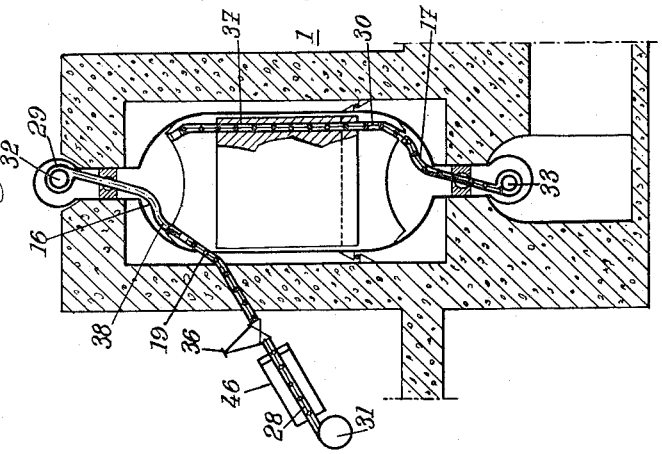
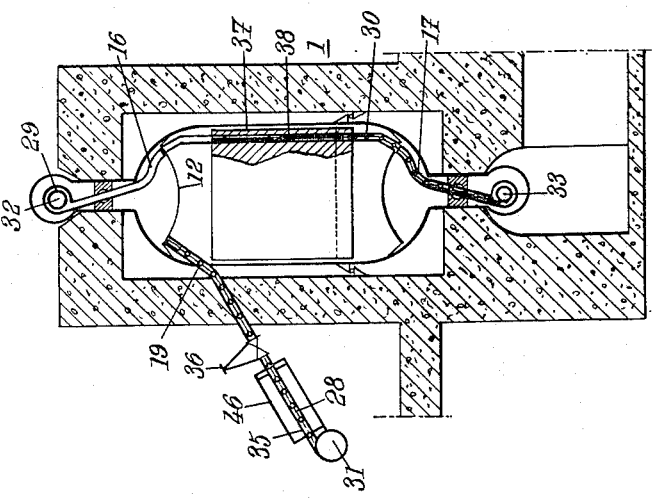

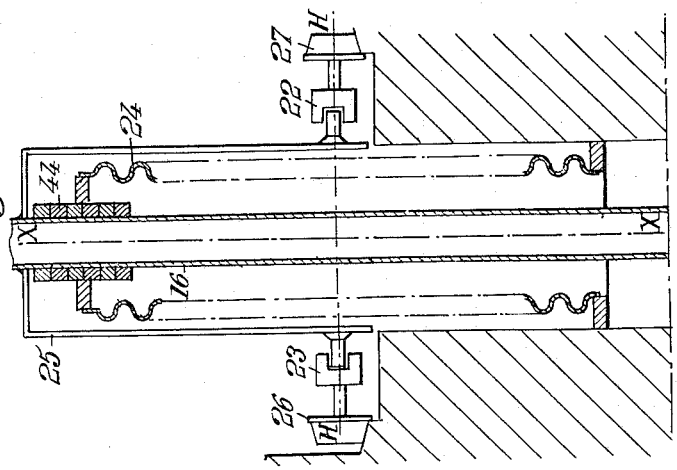
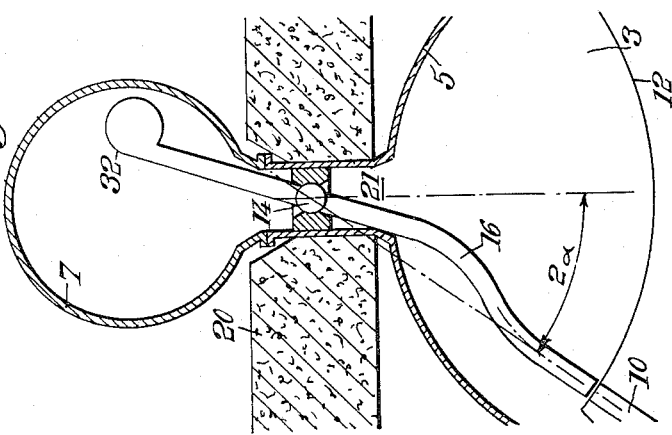
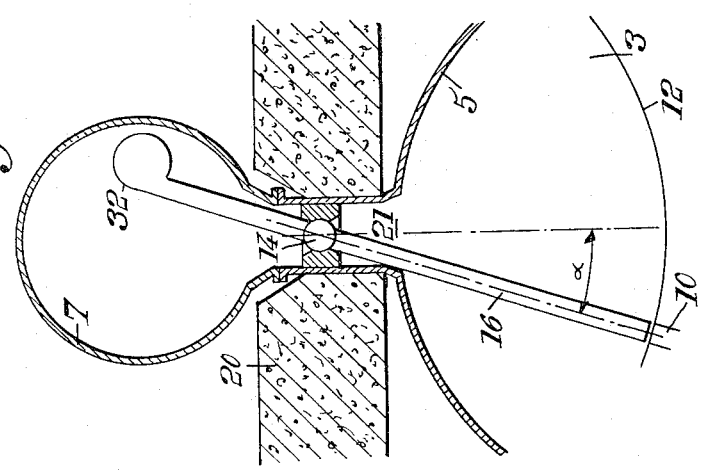

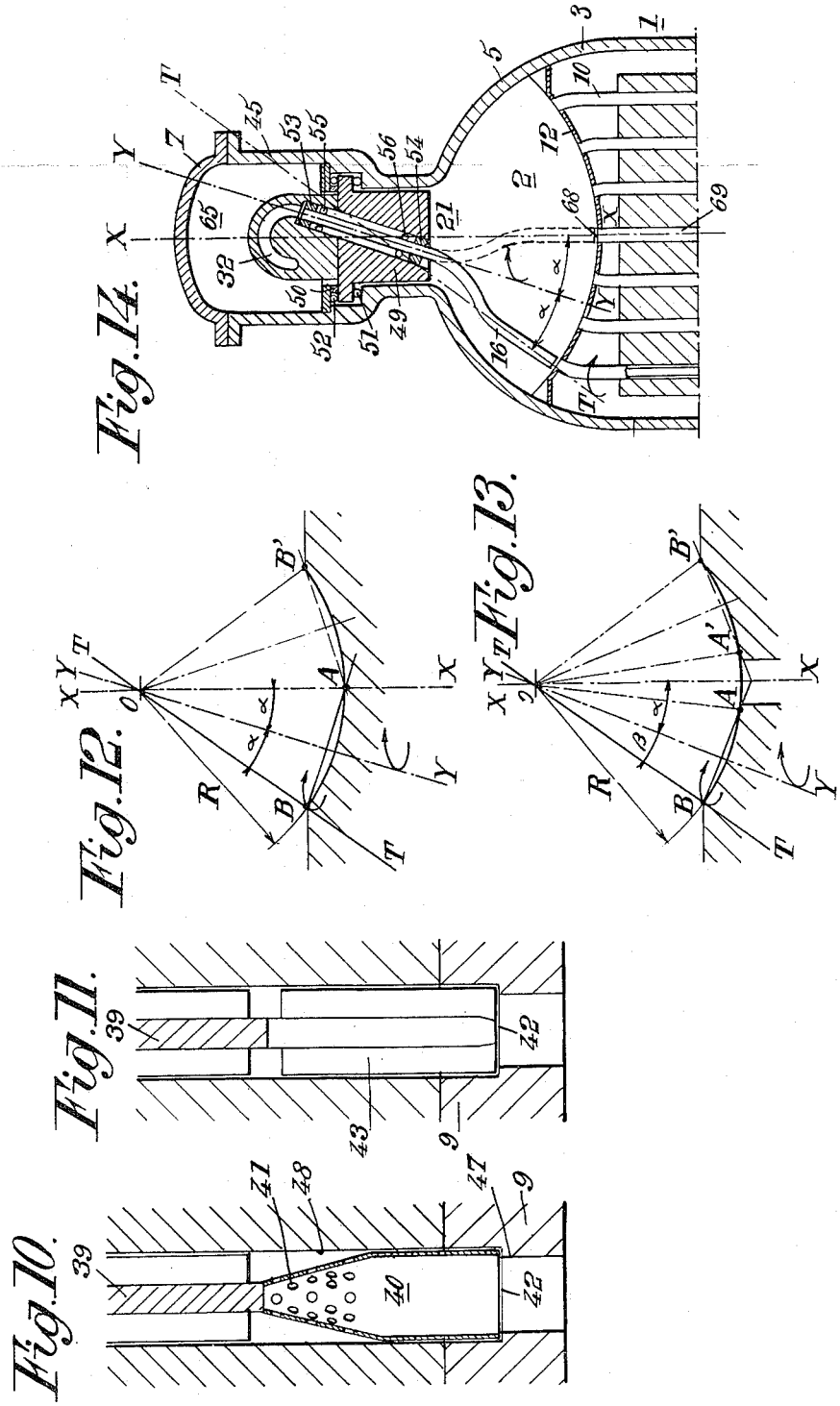

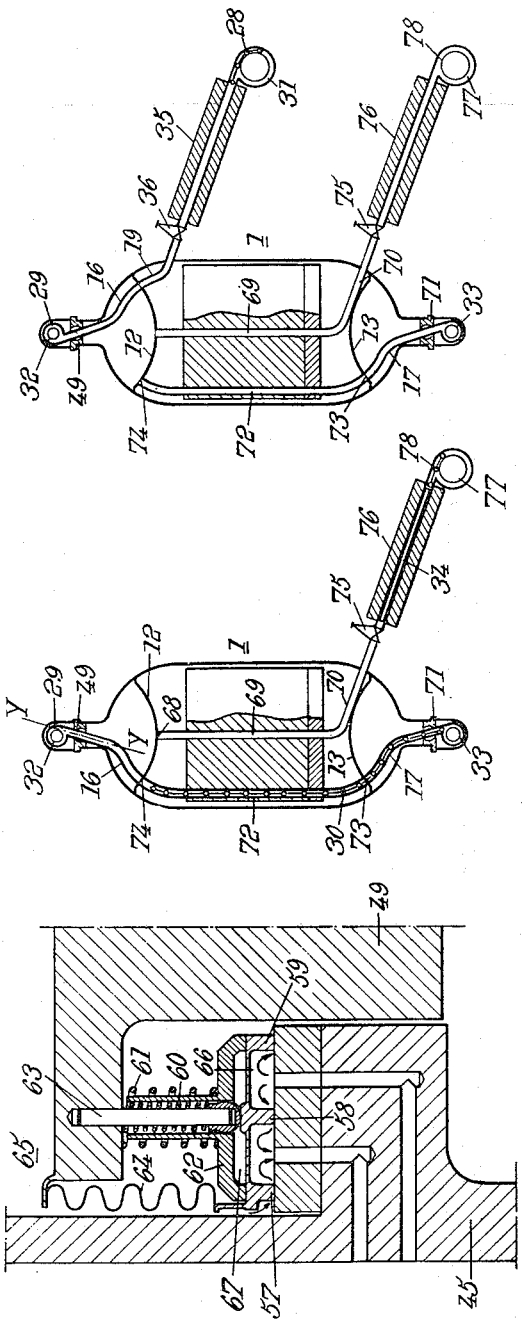

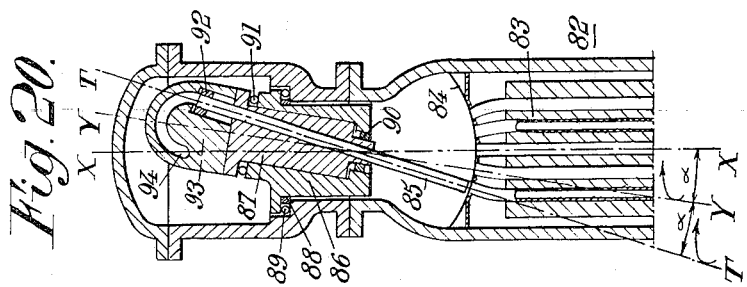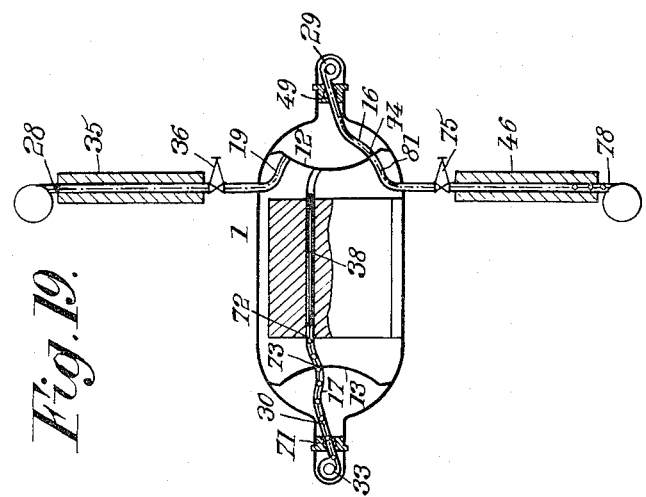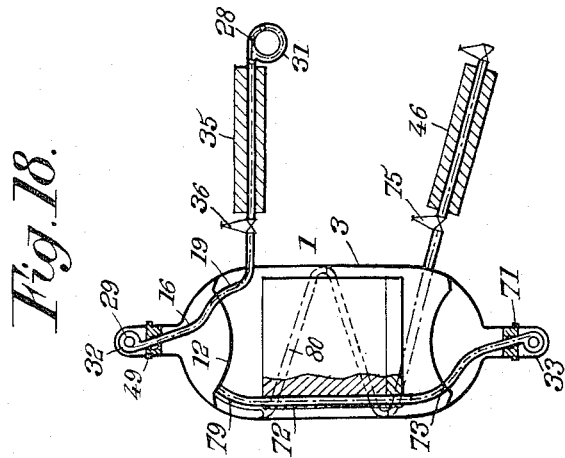

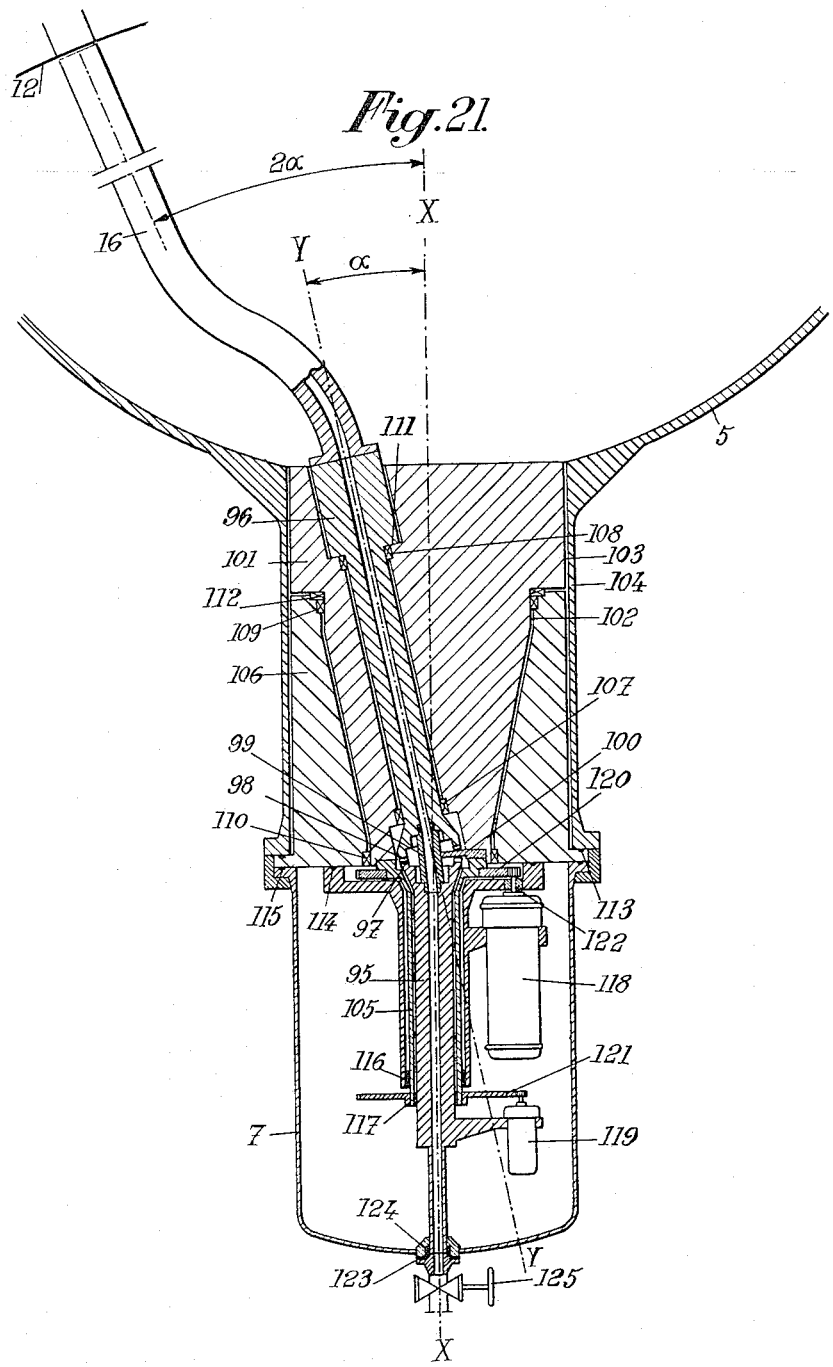

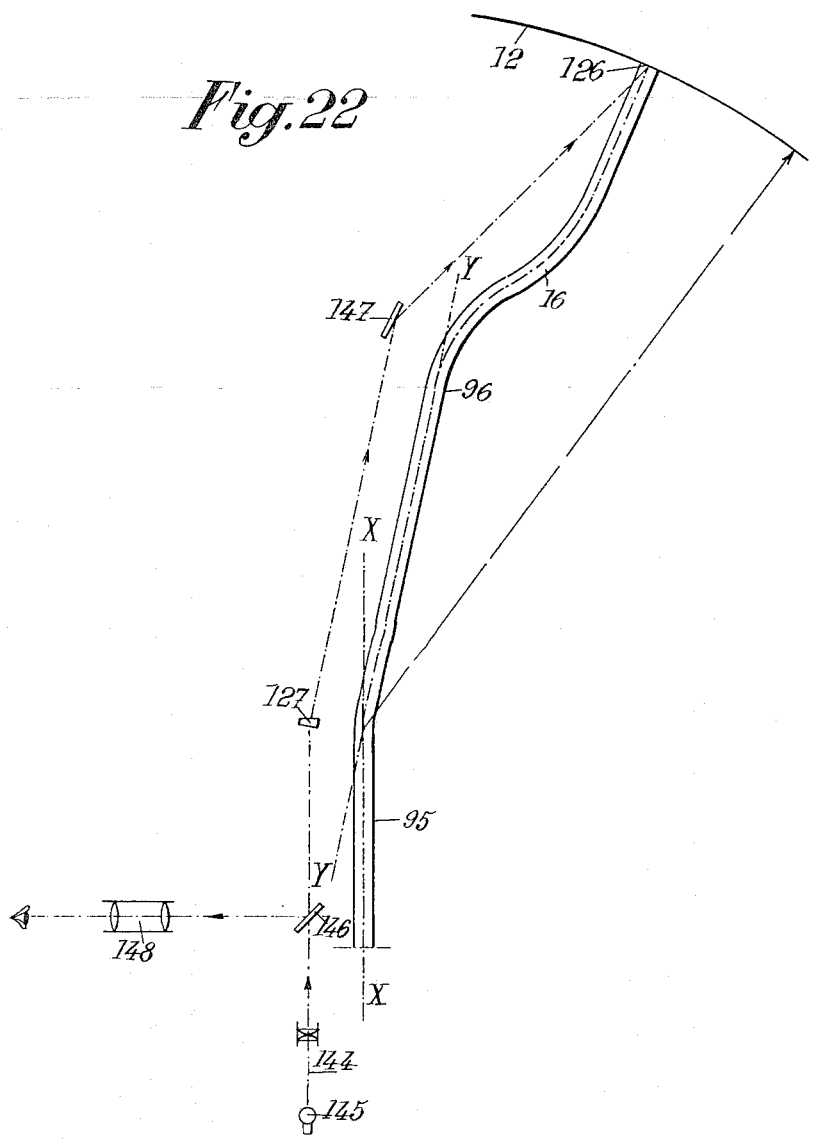

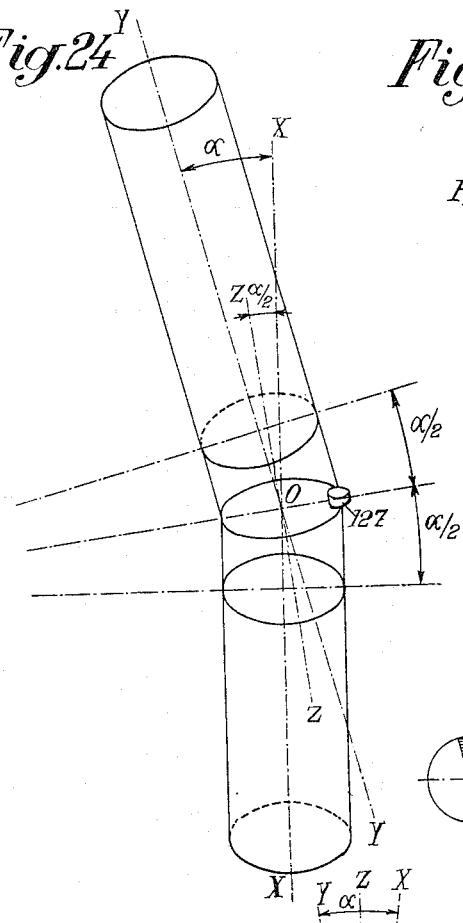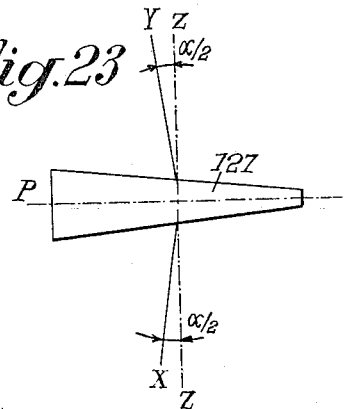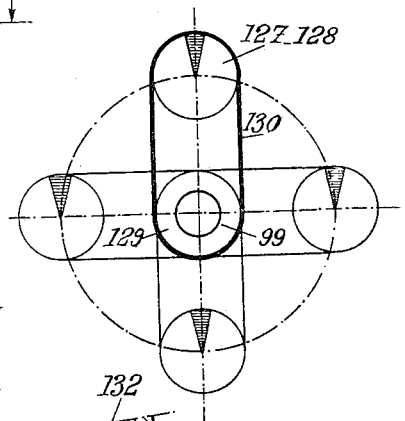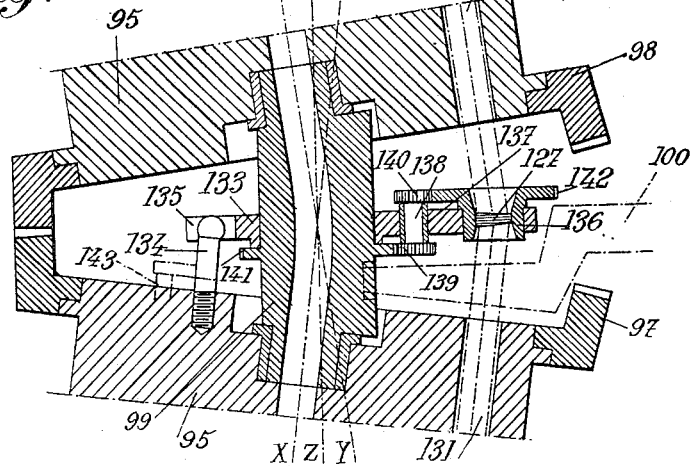

United States Patent Office 3,025,226
Patented Mar. 13, 1962

3,025,226
DEVICES FOR INTRODUCING ELEMENTS, AND IN PARTICULAR FUEL RODS INTO NUCLEAR REACTORS AND/OR FOR WITHDRAWING SUCH ELEMENTS FROM SAID REACTORS
Roger Martin, Paris, and Maurice Moulin, Cite de Gif-sur-Yvette, France, assignors to Commissariat a l'Energie Atomique, Paris, France, a French State administration
Filed Sept. 6, 1957, Ser. No. 682,454
Claims priority, application France Sept. 11, 1956
5 Claims. (Cl. 204—154.2)

The present invention relates to improvements in devices for introducing elements, and, in particular fuel rods into heterogeneous nuclear reactors and/or for withdrawing such elements from such reactors.

As it is known, in nuclear reactors such as they are made at the present time, the fissionable material is generally distributed, in the parallel channels of the core of the reactor, in the form of rods, these rods being themselves constituted by fuel plugs contained in jackets or cans.

Nuclear reactors are, as a rule, cooled by a fluid under pressure (compressed gas, water, or the like) and the casing which surrounds the space under pressure must therefore be provided with the minimum number of orifices, of a diameter as small as possible.

The chief object of this invention is to provide a device of this kind which permits of reducing to a minimum the number and dimensions of the openings to be provided in the casing of the reactor.

For this purpose, according to the present invention, the channels of the reactor core are fitted, at both ends thereof, with tubes forming extensions thereof, these extension tubes constituting two sets, one on each side of said core respectively, the open ends of the extension tubes of each set being located in a surface in the form of a portion of a sphere having its convexity toward said core, said extension tubes having an inner diameter at least substantially equal to the inner diameter of the above mentioned channels and the tubes of each set being shaped so that the portions thereof near their open ends are at least substantially at right angles to the spherical surface corresponding to said set, the casing of the reactor carrying, swivelled therein about the centers of said spherical surfaces respectively, two swinging tubes of an inner diameter at least substantially equal to that of said extension tubes and the respective ends of which are located substantially in said spherical surfaces, so that the swinging end of each of said swinging tubes can be brought into register with any of the open ends of the extension tubes of the corresponding set, means being provided for connecting one end of at least one of said swinging tubes with the outside of the reactor, whereby said last mentioned tube can be used for introducing cylindrical elements of an outer diameter slightly smaller than the above mentioned inner diameter into said channels and for withdrawing such elements from said channels.

Preferred embodiments of this invention will be hereinafter described with reference to the appended drawings given merely by way of example and in which:

FIGS. 1 to 6 diagrammatically show a nuclear reactor having vertical channels and provided with a device according to the invention, these views corresponding to three different positions of the elements of the device, for charging fuel rods into the reactor (FIGS. 1 to 3) and for withdrawing fuel rods from said reactor (FIGS. 4 to 6 inclusive).

FIGS. 7 and 8 are views on an enlarged scale showing two different forms of a swinging tube belonging to the device according to this invention.

FIG. 9 is a diagramatical view of the means for supporting a swinging tube according to the invention.

FIGS. 10 and 11 are partial views showing pieces for supporting a set of jackets in a channel of the reactor.

FIGS. 12 and 13 are diagrammatical views illustrating the geometrical principle of the mounting of a swinging tube according to an embodiment of the invention.

FIG. 14 is a vertical axial view showing an application of this principle.

FIG. 15 is a view on an enlarged scale showing a packing joint for use in a device as illustrated on FIG. 14.

FIGS. 16 to 18 diagrammatically show different modifications of the device according to this invention in the case of a reactor having vertical channels.

FIG. 19 shows another modification in the case of a reactor having horizontal channels.

FIG. 20 shows still another modification in the case of a reactor having a relatively small number of channels.

FIG. 21 is an axial sectional view of a portion of a modification of the device according to this invention.

FIGS. 22 to 24 diagrammatically illustrate the principle of optical means for observing the position of a swinging tube in a construction such as illustrated by FIG. 21.

FIGS. 25 and 26 respectively show two different applications of this principle.

In FIGS. 1 to 6, the device according to the present invention is applied to the case of a nuclear reactor 1 having vertical channels making use of graphite as moderator and in which the coolant is a compressed gas.

The space under pressure 2 is limited by a steel casing 3 which comprises a cylindrical portion 4 and two end portions 5 and 6 of semi-spherical shape on the ends of which may be fitted in gastight fashion two metallic covers 7 and 8. It should be noted that the end portions of this steel casing 3 might be of frusto-conical shape.

The graphite core rests upon a flat base 9 provided with holes located respectively opposite the channels of said graphite core which receive the jackets or cans which contain the fuel slugs. These channels are provided, on either side of the active section 18 of the reactor, with metallic tubes having the same diameter as said channels and forming extension thereof, such as shown at 10 and 11, these extension tubes being bent in such manner that their open ends are at right angles to the spherical surfaces 12 and 13.

Tubes 16 and 17 (FIGS. 7 and 8), which have an inner diameter substantially equal to that of the reactor channels, are swivelled at 14 and 15 that is to say about the centers of the spherical surfaces 12 and 13, the swivelled bearings 14 and 15 being supported by the fluidtight steel casing 3. The swinging ends of said tubes 16 and 17 are located in said spherical surfaces 12 and 13 so that said ends of said tubes 16 and 17 may be brought into register with any of the extension tubes 10 and 11.

The bearing of each swinging tube, for instance the bearing 14 of swinging tube 16, is located at mid-height of the concrete shield 20 which surrounds the casing 3. This arrangement makes it possible to reduce to a minimum the diameter of the orifice provided in the concrete shield, but it increases the diameter of the orifice such as 21 provided in the metallic casing. The dimensions of said bearing will be chosen in order to take these two conditions into account.

In order to reduce the angular displacement of swinging tube 16, that is to say in order to reduce as much as possible the diameter of orifice 21, provided in casing 3, the swinging tube may be bent into an S shape as shown on FIGS. 1 to 6 Angle α (FIGS. 7 and 8) can thus be multiplied by 2 for a given diameter of orifice 21.

The position of the swinging tubes with respect to spherical surfaces 12 and 13 may be observed by means of a periscope (non sensitive to the action of the radiations) suitable marks being provided in the vicinity of the orifices of tubes 10 and 11 when the reactor elements are assembled.

In order to displace the fuel jackets in the channels of the reactor and in other tubes cooperating therewith, such as tubes 10 and 11 and swinging tubes 16 and 17, suitable means are provided, such for instance as chains constituted by a multiplicity of links swivelled together, said swivels being of a diameter just slightly smaller than the diameter of said channels and tubes, so that such a chain can travel through non-rectilinear tubes while being capable of pushing fuel jackets or similar elements through said tubes and channels. Such chains are diagrammatically shown at 28, 29 and 30 on FIGS. 1 to 6, said chains being housed in "corkscrew" or spiral tubes 31, 32 and 33 which permit of winding or unwinding said chains. Chain 28, controlled by its spiral tube 31, can be thus thrust into a connecting tube 19 extending radially from spherical surface 13 through casing 3 and shield 20, this tube 19 thus providing a communication between the inside of the reactor and the outside thereof. Chain 29 actuated by its spiral tube 32 can be pushed through swinging tube 16 and the channel of the reactor located opposite said tube. Finally chain 30 actuated by its spiral tube 33 can be pushed through swinging tube 17 and the channel of the reactor located opposite said swinging tube.

In order to charge the reactor (FIGS. 1 to 3), a set of fresh jackets 34 containing the fuel plugs is placed in a charging tube 35 opposite valve 36 which closes the end of tube 19. This valve 36 is then opened and chain 28 is caused by tube 21 to push this set of jackets 34 into swinging tube 16 through connecting tube 19. The end of this swinging tube 16 is then stopped through any locking means (for instance a pawl) after which said swinging tube is brought opposite the end of the channel 37 to be charged with fuel (FIG. 2).

The above mentioned pawl being retracted, the set of jackets 34 is allowed to come in position in channel 37 by sliding down said channel under the action of gravity, its downward movement being braked by chain 30 which had been pushed upwardly by its control tube 33 and which is now allowed to retract into said tube 33 (FIG. 3). If the friction of the jackets against the wall of channel 37 is too great, chain 29 may be used to push the set of jackets 34 into channel 37 (FIG. 3). When all the channels of the reactor have been charged with fuel, valve 36 is closed.

Gastightness in the charging tube 35 and around chain 28 is ensured by conventional joints which can be used without any difficulty since they are not subjected to the action of radiations.

FIGS. 4, 5 and 6 show the operations that take place when a set of spent fuel jackets is withdrawn from a channel 37 of the reactor.

On FIG. 4, the swinging tubes 16 and 17 have been brought opposite the ends of channel 37 and chain 30, pushed by its control tube 33, through the lower swinging tube 17 pushes the set of jackets 38 upwardly toward the upper swinging tube 16.

On FIG. 5, this swinging tube 16, filled with said jackets 38 is brought opposite the end of connecting tube 19. Chain 28, which had been pushed out by control tube 31, is ready to brake the downward movement of said jackets 38.

On FIG. 6, the set of hot cartridges 38 is discharged into a lead coffin 46 opaque to radiations.

During these operations, the mechanical locking of the swinging tubes in their positions of operation is ensured by means of fingers (not shown) which penetrate into conical holes provided in partitions 12 and 13. These fingers are controlled from the outside through suitable means.

The pawl (not shown on the drawings) provided at the lower end of the upper swinging tube 16 in order to hold the jacket therein is actuated in the same manner.

FIG. 9 shows the suspension means which holds swinging tube 16. This means permits of bringing the end of said tube opposite any of the orifices of the tubes 10 forming extensions of the reactor channels, merely by the combination of a movement of rotation about the axis XX of the spherical surface (this axis being for instance vertical) and of a movement of rotation about an axis HH (horizontal) perpendicular to axis XX. Gastightness is ensured by a metallic bellows rigid with the metallic casing or by enclosing the means for controlling the movement of the swinging tube in a gastight cap (not shown on FIG. 9) subjected to the same pressure as the reactor. In this last mentioned case, the swinging tube must be provided with a television camera so as to permit of observing its position.

In order to be able to rotate about its vertical axis XX, swinging tube 16 is fixed to tube 25, which is rotatable about this vertical axis XX owing to the provision of rollers 26 and 27 (FIG. 9). The bellows 24, fixed to the casing of the reactor, cannot turn about axis XX but is capable of resilient deformations.

The pivoting movement of the swinging tube 16 in the vertical plane passing through XX and at right angles to axis HH is made possible by the provision of horizontal journals 22 and 23 and of the metallic bellows 24. Gastightness between bellows 24 and swinging tube 16 is obtained without difficulty by means for instance of a packing joint such as 44.

This arrangement makes it possible to obtain an improved gastightness as compared to that which can be obtained in the case of a swivel bearing such as shown with reference to FIGS. 1 to 8.

The set of jackets containing the fuel plugs rest in the reactor on a piece made of steel or any other material which is not required to comply with satisfactory nuclear characteristics since this piece may be located outside of the active section of the reactor, for instance in the thickness of the part 9 constituting the base of the graphite core. Such a piece must support the lower jacket or can at the center of its cross-section and it must bear at the periphery upon a small ridge of said base. It must permit circulation of the coolant gas with the minimum pressure drop. Furthermore, its height must be at least equal to twice its diameter in order to avoid any risk of wedging thereof during the charging or withdrawing operations, since this piece moves together with the jackets.

On FIG. 10, the jacket 39 containing the uranium slug is supported by a cylindro-conical piece 40 provided with orifices 41 for the passage of the coolant gas. Piece 40 rests through bearing surface 42 on the flat base 9. The diameter of orifice 47, which is slightly smaller than that of channel 48, determines the dimension of the links of the chain to be used for pushing the sets of jackets.

On FIG. 11, the supporting piece 43 is provided with fins of a resistant metal.

This supporting piece may be replaced by a jacket which must then be reinforced at its bottom.

FIGS. 12 and 13 illustrate the principle according to which the swinging tubes are mounted pivotable about the centers, such as O, of the spherical surfaces 12 and 13, according to an advantageous feature of the invention.

According to this principle, the spherical displacements of the end of the swinging tube are obtained by combining rotations thereof about two axes which intersect each other at the center of the spherical surface, one of these axes being fixed and coinciding with the axis of the spherical surface and the other being movable and making an angle α (FIGS. 12 and 13) with the first one.

Such an arrangement permits in particular:

Of easily obtaining the desired gastightness for the casing of the reactor by means of conventional rotating joints; this permits of having easy access to the various mechanisms for controlling the swinging tubes without being hindered by the hot pressures existing inside the casing;

Of obtaining, owing to the rotating plug which ensures the operation of each swinging tube, protection of the control mechanism thereof against radiations;

Of reducing the dimensions of the casing which contains the mechanism for controlling the swinging tubes;

Of constantly obtaining a good precision in the control of the movements of the swinging tube.

FIG. 12 shows the axis XX of the spherical surface and a second axis YY making a constant angle α with axis XX and intersecting it at point O, which is the center of the spherical surface. FIG. 12 also shows the axis TT which makes an angle equal to 2α with axis XX and also passes through point O.

If B is the point where axis TT intersects the spherical surface and if line OB is given a continuous movement of rotation about axis YY, it describes a cone of revolution having its apex at O and the base of which is a circle of a diameter equal to AB (A being the point where axis XX intersects the spherical surface).

Furthermore, if axis YY is given a movement of rotation about axis XX, the end B of line OB sweeps the whole of spherical surface BAB'. For a given position of axis YY with respect to the axis XX, the end B of line OB always passes through point A when line OB rotates about axis YY.

If line OB is supposed to be a swinging tube such as above described, it is thus possible to bring the end of this tube opposite any of the tubes 10 which form extensions of the reactor channels.

In the case of FIG. 13, where axis YY makes an angle α with XX and axis TT makes an angle β with axis YY (β being smaller than nα), the end B of line OB describes a partial spherical zone BAA'B'. The application of this arrangement makes it possible to connect a swinging tube with the channels of an annular reactor.

In the example illustrated by FIG. 14, the first movement of rotation of swinging tube 16 about axis XX is obtained by means of a rotary plug 49 rotatable about said axis XX and provided with a rotating joint 50. Ball bearings 51 and 52 support the weight of the movable elements.

The second movement of rotation of swinging tube 16, that is to say its movement of rotation about axis YY, itself movable about axis XX, is obtained by the provision of rotating joints 53 and 54 and ball bearings 55 and 56. The combination of these two rotation movements about respective axes XX and YY permits of bringing the end of swinging tube 16 opposite any of the tubes 10 on spherical surface 12.

The S shape of the swinging tube 16 is chosen in order to reduce the diameter of the orifice 21 provided at the end of casing 3. The angle α made by axis YY with vertical axis XX is thus one half of the angle that would be necessary in order to sweep a spherical surface of the same radius as 12 by means of a rectilinear swinging tube.

Fluidtightness of casing 2 is obtained by means of three joints 50, 53 and 54, rotating at relatively small speed, and provided with resilient sliding rings.

The nature of the joint is chosen in accordance with the pressure, the temperature and the importance of the radiation.

Joints made of natural or synthetic rubber may be used since they are protected against gamma radiations by suitable thicknesses of metal. It is also possible to make use of conventional metallic joints.

A metallic joint 50 (FIG. 14) is shown in detail on FIG. 15. This last mentioned figure shows the casing 45 closed by cover 7 and containing the control mechanisms and the rotary plug 49. The metallic joint, of a known type, ensures gastightness by means of three concentric rotating partitions 57, 58 and 59. The central one 58 is kept under pressure by a spring 60 and the external partitions 57 and 59 are maintained by a spring 61 acting through a part 62. The driving and guiding spindle 63 imparts the desired rotary motion of the rotary plug 49 to part 62 and partitions 57, 58 and 59. Bellows 64 ensures gastightness between the rotating plug 49 on the one hand, and the whole of the movable partitions 57, 58 and 59 on the other hand.

During the operation of the reactor, there is maintained in the space 65 of casing 45 a slight pressure with respect to casing 2 to avoid any possible leakage of active gas toward the mechanism.

The metallic joint of FIG. 15 is supplied with a slight gas pressure in the annular chamber 66, in combination with a pumping in the annular chamber 67 concentric to chamber 66, thus preventing the passage of active gas into the space containing the mechanism.

The drive of the pieces rotating about axes XX and YY is achieved by means of worms and worm wheels (not shown on the drawings) actuated for instance by means of electric motors or any other system giving a continuous movement. The bearings which permit rotation of the parts are of conventional construction. The displacements of these parts about axes XX and YY are recorded and transmitted to the outside through teleindicators of convetnional type such as "Selsyns" or "Teledynes."

Withdrawal of the whole mechanism is easily effected by removing cover 7; the end of swinging tube 16 being brought on axis XX (FIG. 14).

The device of FIG. 14 in which axes XX and TT make the same angle with axis YY, has the following interesting property: by mere rotation about axis YY the swinging tube 16 may be brought, as shown in dotted lines, opposite the orifice 68 of the central channel 69 of the reactor. This property makes it possible to use said central channel for charging the reactor or for withdrawing elements therefrom, as it will be hereinafter explained.

The reactor shown by FIG. 16 includes, in addition to the above described parts, a fixed tube 70 connected with the lower end of the central channel 69. FIG. 16 shows the rotary plugs 49 and 71 and a tube 76 on the outside of the reactor adapted to be connected with tube 70 by means of a valve 75. A chain 78 actuated by means of a spiral tube 77 permits of pushing the jackets containing the fuel slugs through tube 76.

In order to charge a channel, such as 72, of the reactor, the following operations are effected (FIG. 16):

Swinging tube 16 is brought opposite the end 68 of the central channel 69 (position shown in dotted lines on FIG. 16);

Swinging tube 17 is brought opposite the lower end 73 of the channel 72 to be charged and chain 30, actuated by tube 33, is brought opposite the upper end 74 of said channel 72;

Valve 75 being opened, chain 78 is actuated by tube 77 and pushes the set of jackets 34, previously introduced into tube 76 into swinging tube 16;

This swinging tube 16 is brought opposite the end 74 of channel 72;

Chain 30, allowed to retract into tube 33, brakes the downward movement of the set of fresh jackets 34 through channel 72.

Withdrawal of elements from the channels of the reactor takes place in the same manner by operations performed in the reverse order, the jackets or cans being then collected in a lead coffin substituted for tube 76.

FIG. 17 shows a modification in which the slugs are introduced into the reactor through tube 19 by means of valve 36, driving tube 35, and control tube 31 which operates chain 28, withdrawal of the elements taking place through tube 70, the remainder of the device being similar to that described with reference to FIG. 16.

FIG. 18 shows still another modification; in this case, the slugs are introduced laterally through tube 19; withdrawal of the elements takes place through a tube 79 starting from spherical surface 12 and which leads said elements toward a helical chute 80 extending along the inner wall of the casing 3. This chute 80 brakes the downward movement of the slugs and brings them by gravity into the lead coffin 46 without requiring a chain such as above described for braking this downward movement. Such an arrangement is particularly suitable in the case of a reactor without a central channel.

FIG. 19 shows how the device according to the invention, can be applied in the case of a reactor having horizontal channels. In this case, the elements are introduced through tube 19 and they are withdrawn through tube 81. The operations are performed by means of four chains as above described, respectively designated by the references numerals 28, 29, 30 and 78.

The operations are as follows:

For charging the reactor—

Swinging tube 16 is brought opposite the orifice of tube 19;

A set of fresh slugs is charged into swinging tube 16 by means of chains 28 and 29;

Swinging tube 16 is brought opposite the channel 72 to be charged with slugs;

Chains 29 and 30 bring the set of fresh slugs into position into the last mentioned channel.

In order to withdraw slugs from the reactor—

Swinging tubes 16 and 17 are brought opposite the channel 72 from which said elements are to be removed;

Chain 30 pushes the set of slugs 38 into the swinging tube 16;

Swinging tube 16 is brought opposite tube 81;

Chain 78, which had then previously expanded, brakes down the movement of slugs 38 toward the lead coffin 46.

FIG. 20 illustrates the application of the invention to a reactor making use of enriched fuel in which the number of the cells is considerably lower than that of a reactor making use of natural uranium. The reactor 82 is of the type having vertical channels and making use of a solid coolant, but the diameter of the active section 83 and the dimension of the spherical surface 84 are considerably smaller than in the preceding example. This makes it possible to reduce the angle α made by axis YY with axis XX (FIG. 20) and of using a swinging tube 85 of rectilinear shape.

The movement of tube 85 is obtained by means of two rotary plugs 86 and 87. The first plug 86 permits rotation of swinging tube 85 about the vertical axis XX and it includes a rotating metallic joint 88 and a thrust ball bearing 89. The second plug 87 is movable with respect to the first one about axis YY and a rotating metallic joint 90 and a thrust ball bearing are interposed between these elements. Swinging tube 85 is mounted fixed in the rotary plug 87 and it is connected by a joint 92 with piece 93 which contains the corkscrew or spiral tube 94 for controlling the chain which is to actuate the set of slugs (this chain being not shown).

This modification also permits of inserting into a horizontal or vertical reactor, or removing therefrom, articles to be irradiated, provided that these articles are placed in containers of dimensions identical to those of the jackets containing the fissionable material. An outlet channel provided especially for this kind of operation is then necessary. But the introduction of the containers may take place in the same manner as that of the fuel jackets.

When the device is used in connection with reactors the central portion of which is provided with an important conduit (annular reactor) the swinging tube is arranged in such manner that in the course of its rotation about axis YY it does not come into the above central zone. This case corresponds to the geometrical principle described with reference to FIG. 13 in the case where β is smaller than α.

FIG. 21 shows an embodiment of the invention relating to the case in which the swinging tube carries, operatively connected with itself, a tube forming an extension therefrom and extending along the axis of the spherical surface.

Such an arrangement makes it possible in particular to reduce the dimensions of the apertures which are to be provided in the shield of the reactor for passage of the swinging tubes, of reducing the diameter of the rotating joints which improve gastightness, of reducing the weight of the parts driven in rotation, of accelerating the operations to be performed in the reactor and of making independent of the movable parts the mechanism serving to push the slugs, or rather the jackets containing them, into the tube and channels, such a mechanism being possibly located on the outside of the metallic covers.

In the preceding embodiments, where the swinging tube was mounted rotatable both about the axis XX of the corresponding spherical surface and about an axis YY intersecting XX (FIGS. 12, 13, 14 and 20) each swinging tube extended on either side of axis XX. In the embodiment which will now be described, the movement is still obtained by combination of the two above mentioned rotations, but the swinging tube proper does not extend beyond the point of intersection of axes XX and YY. However, this swinging tube may be considered as constituted by the combination of the above mentioned portion and of another portion located along axis XX.

As shown by FIG. 21, the swinging tube 16 is therefore made of two tubular portions, one, 95, the axis of which is in coincidence with the axis XX of the spherical surface 12 and the other 96, the axis YY of which makes with axis XX an angle α, these two tubular portions being mounted to pivot about their respective axes and the rotating movement of one being transmitted to the other by means of conical pinions 97 and 98 carried by the adjoining ends of said portions 95 and 96.

The adjoining ends of said tube elements may be so close to each other that the gap between them has no inconvenience. However, preferably, continuity of the inner wall of swinging tube 16 is ensured by a connecting element 99 of toroidal shape, which is prevented from rotating with respect to the swinging tube by a finger 100 rigid with the support 101 of said tube. Finger 100 passes between the conical pinions 97 and 98 in the region where these pinions are spaced away from each other.

Support 101 is pivotally mounted about axis XX.

The greater part of support 101, as shown on FIG. 21, has substantially the shape of a frustum of a cone the generatrix of which makes an angle α with axis XX, this support being provided with a cylindrical housing similarly inclined with respect to axis XX and adapted to receive the portion 96 of the swinging tube. Beyond the larger base of this frusto-conical portion of support 101, said support includes two cylindrical portions 102 and 103. Portion 103 is of a larger diameter than 102 and it forms a projecting shield its diameter being close to the inner diameter of the metal wall 104 of the reactor of this place. Support 101 carries, rigid therewith and extending from its smaller base, a sleeve 105 forming a housing for a tube 95.

The whole of this support 101 is mounted in a fixed housing 106, of corresponding shape, fixed in gastight fashion on the wall 104 of the reactor with the provision of static joints 113.

The whole of the swinging tube 16 moves in support 101 and support 101 moves in its housing 106 owing to the provision of ball bearings 107, 108, 109, 110 and of thrust bearings 111, 112.

Gastightness is obtained by means of static joints 113, 114, 115 and of rotating joints 116, 117 of relatively small diameters.

The drive is ensured by means of motors 118 and 119 carried respectively by the fixed housing 106 and by tube 95 and adapted to drive toothed-wheels 120 and 121 respectively rigid with support 101 (the transmission of movement from motor 118 to pinion 120 requires the provision of a rotating joint 122). The first motor 118 therefore controls the rotation movements of support 101 with respect to its fixed housing and the second motor 119 those of the swinging tube with respect to said support 101.

By suitably operating these motors 118 and 119, it is therefore possible to rotate:

Either support 101 alone about axis XX;

Or swinging tube 16 alone, that is to say tube 96 about its axis YY which is then fixed;

Or both swinging tube 16 about axis YY and said axis YY about the fixed axis XX by simultaneous rotation of support 101 about this last mentioned axis.

A bell-shaped cover 7 may be fitted in gastight and removable fashion on the edge of the casing 4, 104 of the reactor. This cover is provided in its central part with a hole through which passes tube 95 with the interposition of a static joint 123 and a rotating joint 124 (which is necessary even in the absence of cover 7) for connection with the mechanism located outside said cover, which pushes the slugs into swinging tube 16.

In this case, the elements introduced into the reactor or withdrawn therefrom pass directly from one end to the other of the swinging tube instead of being first introduced thereinto and removed therefrom as in the preceding embodiment.

The static joints (113 to 115 and 123) which are located behind a thick shield may be made of synthetic rubber such as known under the name of "Perbunan," or of any other similar material.

The whole of the control mechanism may be placed in a space where the pressure is equal to or higher than that existing in the reactor. In this case, when one of the rotating joints is injured, the pure gas contained in this space has a tendency to flow into the reactor and prevents the outflow of gas from the reactor to the outside, which might have a detrimental action on said mechanism.

A valve 125, placed on the inside or on the outside of cover 7 permits of separating the external parts from those located inside wall 104 and said cover.

In order to follow the displacements of the swinging tube inside the reactor, it is desired to observe for instance a small plate provided close to the end of said tube and indicating the number of the channel opposite which said end is located, or to make sure that this end of the swinging tube is truly located opposite a channel. Other verifications may be necessary.

Now, as the axis of the swinging tube is not available for the passage of a light beam, it is necessary to make use of a beam parallel to this axis, and this beam must be capable of rotating about the two axes XX and YY at the same time as the end 126 (FIG. 22) of the swinging tube 16 moves along the spherical surface 12.

For this purpose, it suffices constantly to deflect a light beam parallel to axis XX and capable of turning about said axis, into a beam parallel to axis YY and capable of turning similarly and simultaneously about said last mentioned axis, and to provide means rigid with tube 96 for constantly directing said last mentioned beam toward end 126 of the tube. As a matter of fact, whatever be the angular position of said end 126 with respect to either of the axes XX and YY, the metering beam will be deflected to reach the end 126.

In order to obtain this deflection, there is provided a deflecting optical means capable of being displaced, while remaining parallel to itself, about the internal bisectrix ZZ of the angle made by the two axes XX and YY.

Preferably, said deflecting optical means consists of a prism 127 (FIGS. 23 to 26), but it might also be constituted by a mirror or the like. This prism has its middle plane in coincidence with the plane P passing through the point of intersection of axes XX and YY and perpendicular to the internal bisectrix ZZ of the angle made by these axes.

If this prism is given a circular movement about axis ZZ, while keeping it constantly parallel to itself, an incident ray and the corresponding deflecting ray describe cylinders the cross-sections of which are elliptical and the axes of which make an angle α with each other and intersect each other at a point O (FIG. 24).

As this angle α is small in the application that is considered, the elliptical cylinders may be considered as equivalent to cylinders of revolution in view of the fact that the prism is larger than the light beam by an amount greater than the difference between the half-axes of the ellipses, which can therefore be considered as circles.

The fact that axis ZZ is chosen as axis of rotation of prism 127 permits of distributing equally the small radial displacements of the light beams, respectively parallel to axes XX and YY, on the trajectories along which said two beams are travelling about said axis. This choice also permits of utilizing the prism in symmetrical fashion, each of the two refractions undergone by the light beam as it enters and as it leaves the prism respectively detecting said beam by an angle $$\frac{\alpha}{2}$$

In order to rotate prism 127 about axis ZZ while keeping it parallel to itself, it may be given the shape of a cylinder of revolution, or be mounted in a support in the form of a cylinder of revolution 128. There is provided around connecting sleeve 99 (FIG. 21) a ring 129 (FIG. 25) which is also in the form of a cylinder of revolution about axis ZZ and of the same diameter as said prism or of said support thereof and capable of turning together with swinging tube 16, a belt or preferably a chain 130 (FIG. 25) passing round both of the cylinders 127 or 128 and 129 and thus causing them to maintain identical angular positions.

It is also possible, according to a preferred embodiment, to make use of two sets of gear-wheels of reciprocal ratios made as hereinafter described with reference to FIG. 26.

Tube 95 and tube 96 are provided, at the same distance from axes XX and YY respectively, with two channels 131 and 132 intended to permit the passage of light beams the axes of which remain in the same plane due to the synchronism of the rotation movements of tube 95 and tube 96.

The external surface of sleeve 99 is machined to form a cylinder of revolution about axis ZZ and constitutes a journal for a piece 133 freely rotatable about said sleeve 99 under the action of a finger 134 rigid with tube 95 and engaged in a slot 135 of said piece 133.

Piece 133 carries a casing 136 containing prism 127 disposed as above explained and a bearing 137 in which is pivoted a spindle 138 carrying two pinions 139 and 140. Pinion 139 meshes with a toothed-wheel 141 rigid with sleeve 99 and pinion 140 meshes with a toothed-wheel 142 rigid with casing 136. The gear ratios of pinion 141 with respect to 139 and 140 with respect to 142 are reciprocal, so that casing 136 which contains the prism turns about its axis in the same manner as piece 133 rotates about axis ZZ.

This means that if the swinging tube 16 rotates alone whereas its support 101 remains stationary, prism 127 will rotate about axis ZZ in the same manner as tube 95 about axis XX, due to the driving action of finger 134, but this prism will remain parallel to itself due to the fact that sleeve 99 is kept in position by finger 100 rigid with support 101.

It should be noted that, as the material of which the prism is made is sensitive to gamma rays, it is advisable to retract said prism from the beam of radiations coming from the reactor when it is not used for observation. For this purpose, for instance, finger 134 may be constituted by a crank (shown at 143 in dotted lines on FIG. 26) cooperating with slot 135 and which permits by its rotation of angularly offsetting said prism about axis ZZ with respect to said beam.

FIG. 22 shows the path of travel of a light ray 144 coming from a source 145, which passes through a plate glass, then through prism 127, after which it is reflected by mirror 147 toward the end 126 of the swinging tube or toward a portion of the spherical surface 12 close to this end. In the reverse direction, the light beam is reflected by the plate glass 146 and received by the observer after it has passed through a conventional optical system such as shown at 148.

Of course, if the apparatus is placed under too high a pressure, the images of the area 126 may be transmitted by television means to the observer through the shield of the reactor.

In a general manner, while there has been disclosed, in the above description, what may be held as practical and efficient embodiments of the invention, it should be well understood that said invention should not be considered as limited thereto as there might be changes made in the arrangement, disposition and form of the parts without departing from the principle of the present invention as comprehended within the scope of the accompanying claims.

In particular, a device according to the present invention might be used for handling radioactive elements in channels analogous to those of a nuclear reactor.

The device according to this invention has many advantages, and in particular, the following ones:

It permits of substantially reducing the number of orifices provided through the shield of the reactor and the dimensions of said orifices;

This device does not call for the presence of any movable mechanical piece inside the reactor;

All the mechanical parts are operatively connected with the swinging tubes and they can be removed together with them.

The device according to this invention permits of replacing some slugs without having to withdraw the whole of the coolant fluid.

Finally, all the jackets containing the slugs to be operated by the device need not be interconnected since they are pushed by a suitable mechanism such as a chain as above described.

The device above described is particularly suitable in the case of a vertical reactor making use of a solid moderator and cooled by means of a compressed gas. However, it may also be used in the case of a vertical reactor moderated by means of heavy water provided that the active rods are constituted by a stack of jackets or cans of suitable length, these cans being disposed in tubes of material having a low cross-section of absorption for neutrons, such for instance as aluminum, beryllium, zirconium or alloys thereof.

The device according to the invention may also be applied to horizontal graphite reactors.

What we claim is:

1. In a nuclear reactor of the type having a substantially cylindrically shaped core, comprising in combination, a casing, said core housed within said casing and having at least one end thereof formed with a concave depression defining a spherical surface portion, said core having a plurality of channels running the longitudinal length thereof, each comprised of straight central sections and having one group of ends thereof formed in a direction normal to said spherical surface portion, a reduced neck portion of said casing spaced from said core, a swing tube rotatably and pivotally supported in said reduced portion about a point on the central longitudinal axis of said core, said swing tube having an outer end extending beyond said neck portion and an open end adjacent to said surface portion and being movable about said point so as to be operatively positioned at any desired location on said spherical surface portion, a fixed connecting tube extending through said casing and said core and terminating at said spherical surface portion, said connecting tube having a length adjacent to said first spherical surface portion, perpendicular thereto, first means to move said open end of said swing tube to points in communication with said connecting tube and said channels, second means for introducing cylindrical elements into said connecting tube and into said swing tube when said swing tube is in communication with said connecting tube, said first means including apparatus connected to said outer end for rotating and pivoting said swing tube around two converging axes converging at the center of said spherical surface portion, one of said axes being stationary and constituting the central longitudinal geometrical axis of said spherical surface portion whereby a cylindrical element received by said swing tube can be delivered to any of said channels.

2. The nuclear reactor defined in claim 1 wherein the inner diameter of said reduced portion is substantially less than one-half the diameter of a cross section of said core.

3. The nuclear reactor defined in claim 1 wherein the other end of said core is formed with a second concave spherical depression and the other group of ends of said channels have end sections formed normal to said second concave spherical depression, a second reduced portion in said casing spaced from said core, a second swing tube pivotally supported in said second reduced portion and operably connected to said first means such that when said second swing tube is in communication with one channel it is always in communication with the same channel as said first swing tube, means in said second swing tube to aid in the insertion and removal of said cylindrical object from any of said channels.

4. The nuclear reactor defined in claim 1 including optical means for deflecting a light beam in synchronism with the movements of said swing tube whereby the position of said swing tube may be detected by observing said beam.

5. The nuclear reactor defined in claim 1 wherein said swing tube is comprised of first and second straight portions connected by a curved portion located inside said casing, said first straight portion extending into said reduced portion and surrounding the other of said axes, said second straight portion having an axis converging at said center, said curved section so dimensioned that the angle between said central longitudinal axis and the other of said axes is one-half of the angle between said central longitudinal axis and the axis of said second straight portion.

References Cited in the file of this patent
UNITED STATES PATENTS

| | | |
|---|---|---|
| 647,347 | Wellman et al. | Apr. 10, 1900 |
| 1,617,732 | West et al. | Feb. 15, 1927 |
| 2,756,858 | Kasschau | July 31, 1956 |
| 2,782,158 | Wheeler | Feb. 19, 1957 |

OTHER REFERENCES

Dent et al.: Uranium Fuel Handling, J. Brit. Nucl. Energy Conf., April 1957, pages 154 and 155.